(12) United States Patent
Charnay et al.

(10) Patent No.: US 11,505,370 B2
(45) Date of Patent: Nov. 22, 2022

(54) CLOSURE CAP FOR A DEVICE FOR PACKAGING A PRODUCT, NOTABLY A COSMETIC PRODUCT

(71) Applicant: L'Oreal, Paris (FR)

(72) Inventors: Patrick Charnay, Clichy (FR);
Thomas Boudot, Clichy (FR);
Stéphanie Marcq, Clichy (FR);
Laurence Gerard, Clichy (FR)

(73) Assignee: L'Oréal, Paris (FR)

( * ) Notice: Subject to any disclaimer, the term of this patent is extended or adjusted under 35 U.S.C. 154(b) by 258 days.

(21) Appl. No.: 16/499,128

(22) PCT Filed: Mar. 22, 2018

(86) PCT No.: PCT/EP2018/057250
§ 371 (c)(1),
(2) Date: Sep. 27, 2019

(87) PCT Pub. No.: WO2018/177867
PCT Pub. Date: Oct. 4, 2018

(65) Prior Publication Data
US 2021/0086955 A1    Mar. 25, 2021

(30) Foreign Application Priority Data

Mar. 27, 2017    (FR) ...................................... 1752513

(51) Int. Cl.
*B65D 41/04*    (2006.01)
*B29C 45/26*    (2006.01)
*B65D 47/12*    (2006.01)

(52) U.S. Cl.
CPC ..... *B65D 41/0471* (2013.01); *B65D 41/0421* (2013.01); *B29C 45/2618* (2013.01); *B65D 47/122* (2013.01)

(58) Field of Classification Search
CPC ............ B65D 41/0471; B65D 41/0421; B65D 47/122; B65D 41/04; B29C 45/2618
(Continued)

(56) References Cited

U.S. PATENT DOCUMENTS 3,737,277 A    6/1973 Uhlig
3,826,395 A *  7/1974 Montgomery ....... B65D 50/046
                                                215/221

(Continued)

FOREIGN PATENT DOCUMENTS

CN    1493506 A    5/2004
EP    0345173 A1   12/1989
(Continued)

OTHER PUBLICATIONS

International Search Report dated Aug. 6, 2018, issued in in corresponding Application No. PCT/EP2018/057250, filed Mar. 22, 2018, 3 pages.

*Primary Examiner* — James N Smalley
(74) *Attorney, Agent, or Firm* — Christensen O'Connor Johnson Kindness PLLC

(57) ABSTRACT

The closure cap for a container comprises an internal skirt (16) comprising a bore (16*b*) provided with at least one helical screw thread (19) for screwing said cap onto the container, an external skirt (18) radially surrounding said internal skirt at least partially, and a front wall (14) from which said internal and external skirts extend. The cap is produced by moulding at least one synthetic material. At least one recess (30) is formed on an outer surface (16*a*) of the internal skirt, remaining axially away from a front end face (16*c*) of said skirt.

12 Claims, 6 Drawing Sheets

Figure 1:
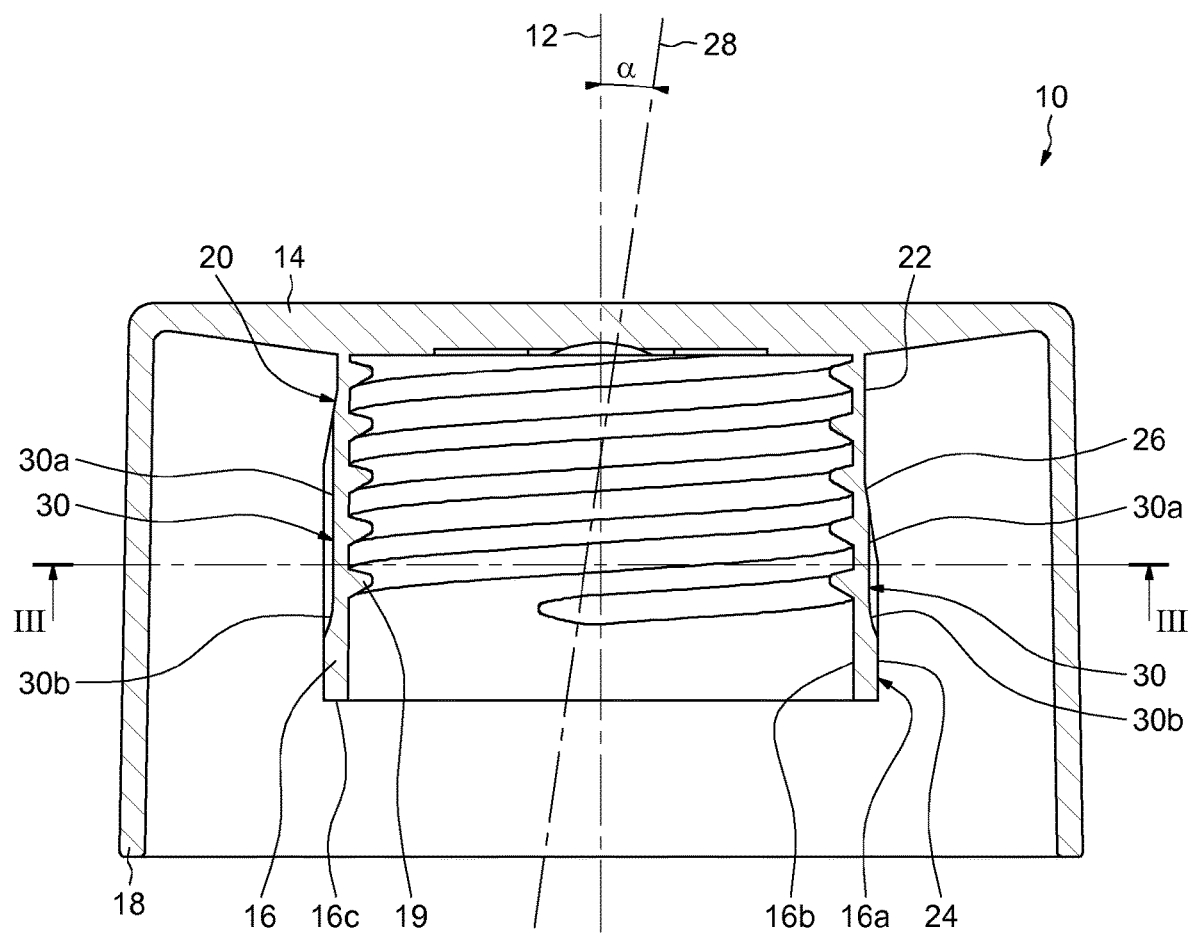

(58) Field of Classification Search
USPC .................. 215/305, 329, 341–352; 220/288
See application file for complete search history.

(56) References Cited

U.S. PATENT DOCUMENTS

| | | | | |
|---|---|---|---|---|
| 3,888,373 | A * | 6/1975 | Gach ................... | B65D 50/046 215/214 |
| 4,138,028 | A * | 2/1979 | Price ................... | B65D 50/046 215/216 |
| 4,756,435 | A * | 7/1988 | Schick ................. | B65D 50/046 222/153.09 |
| 5,281,385 | A | 1/1994 | Julian | |
| 6,258,078 | B1 | 7/2001 | Thilly | |
| 7,464,830 | B2 * | 12/2008 | Baughman ............. | B21D 51/50 220/601 |
| 8,061,543 | B2 * | 11/2011 | Baughman ........... | B65D 39/082 220/254.1 |
| 2002/0185464 | A1 * | 12/2002 | Luker ................ | B65D 41/0414 215/334 |
| 2010/0288787 | A1 * | 11/2010 | Jackel ................... | B65D 41/17 220/849 |
| 2019/0234540 | A1 * | 8/2019 | Marici ................... | F16L 15/06 |

FOREIGN PATENT DOCUMENTS

| | | | |
|---|---|---|---|
| GB | 1596983 | A | 9/1981 |
| WO | 2006/000779 | A2 | 1/2006 |

* cited by examiner

CLOSURE CAP FOR A DEVICE FOR PACKAGING A PRODUCT, NOTABLY A COSMETIC PRODUCT

The present invention relates to a closure cap or lid that is able to be fastened removably to a container produced for example in the form of a pot, bottle, etc.

The invention is particularly suitable for sealing containers for storing cosmetic, pharmaceutical or dermato-pharmaceutical products. Such products can, for example, be dispensed in an aqueous form, in the form of an oil, a milk, a cream, a paste, a gel, a foam, etc.

In the field of cosmetics, it is relatively common to use closure caps produced by moulding a plastics material. Conventionally, such a cap comprises an internal skirt provided on the inside with a screw thread for fastening to the associated container, an external enclosing skirt surrounding the internal skirt and a front wall to which the skirts are joined. Such caps are also widely used in the field of sealing bottles containing liquids to be drunk. For more details on the design of these caps, reference may be made for example to the Patent Application FR-A1-2 523 551.

Conventionally, the closure cap is moulded inside a mould that mainly comprises a matrix provided with a cavity with a shape corresponding to the outer shape of the cap, and an inner and an outer core for moulding the inner shapes thereof. The inner core comprises, on its outer surface, at least one helical groove for moulding the screw thread of the internal skirt of the cap.

In order to allow the inner core to be unscrewed from the cap during demoulding, anti-rotation reliefs are formed on said cap and cooperate with the outer core in order to prevent rotation of the cap.

Generally, the anti-rotation reliefs are in the form of ribs protruding from the outer surface of the internal skirt of the cap. Alternatively or in combination, these reliefs of the cap can be realized in the form of teeth formed on the front end face of the internal skirt, and/or on the lower face of the front wall to which the internal skirt is joined.

When the cap is detached from the associated container, these anti-rotation reliefs are visible to a consumer, this impairing the aesthetic appearance and the perceived quality of the cap.

The present invention aims to remedy these drawbacks.

The subject of the invention is a closure cap for a container, comprising an internal skirt provided with a bore comprising at least one screw thread for screwing said cap onto the container, an external skirt radially surrounding said internal skirt at least partially, and a front wall from which said internal and external skirts extend. The cap is produced by moulding at least one synthetic material.

According to one general feature of the cap, at least one recess is formed on an outer surface of the internal skirt, remaining axially away from a front end face of said skirt.

A "recess" is understood to be a depression or part which is recessed with respect to the outer surface of the internal skirt.

The recess(es) formed on the outer surface of the internal skirt make it possible to ensure the anti-rotation function of the cap during the step of unscrewing the inner core of the mould during the phase of demoulding said cap.

The provision of one or more recesses which extend in a set-back manner with respect to the outer surface of the internal skirt and which remain axially away from the front end face of this skirt has the advantage of making the presence of this or these anti-rotation element(s) less visible to the consumer and thus of improving the appearance of the cap.

Said recess may extend into the thickness of the internal skirt without emerging inside the bore of said skirt.

Preferably, said recess comprises a bottom wall that is offset radially inwards with respect to the outer surface of the internal skirt, at least one lateral edge being joined to the bottom wall and delimiting said recess in the circumferential direction, and at least one end edge being joined to the bottom wall, being situated axially towards the front end face and delimiting said recess in the axial direction.

With such a design, it is possible to provide for said lateral edge to extend axially with respect to a central axis of said cap. This helps to keep the cap properly in position during the step of unscrewing the inner core of the mould.

With this design, it is also conceivable to provide for the end edge of said recess, which is situated axially towards the front end face, to extend obliquely between the bottom wall and the outer surface of the internal skirt. Such an orientation enables demoulding of the cap by force. To this end, the value of the angle formed between the direction of extension of said end edge and a central axis of said cap is preferably between 10° and 85°, better still between 20° and 30°.

In a variant, it is also conceivable to provide for the end edge of said recess to extend between the bottom wall and the outer surface of the internal skirt, following a curved profile. Such curvature of the surface defined by the end edge enables demoulding of the cap by force.

By way of indication, the recess(es) are preferably grooves and/or striations. The recess(es) may be realized in the form of dishes or cavities that have a circular or polygonal, such as square, rectangular, etc., profile in cross section.

When a plurality of recesses are formed on the outer surface of the internal skirt, said recesses may be spaced apart from one another regularly in the circumferential direction. This makes it possible to obtain good material homogeneity and limits the risk of the occurrence of deformations in the outer surface of the internal skirt of the cap, it being possible for said deformations to be visible to the consumer when the cap is removed from the associated container.

As indicated above, said screw thread of the internal skirt is helical in order to ensure that the cap is fastened to the associated container by screwing. The screw thread may be continuous in the circumferential direction. Alternatively, the screw thread may be discontinuous in the circumferential direction. In this case, said screw thread of the skirt may comprise a plurality of thread segments that are spaced apart from one another in the circumferential direction, being arranged helically on the bore of the internal skirt of the cap.

In order to enable good leaktightness between the associated container and the cap to be obtained, the latter may accommodate an inserted seal mounted in abutment against the front wall of the cap. In this case, it is possible to provide, on the internal skirt of the cap, at least one retaining bulge for the axial retention of the seal against the front wall. Alternatively, this axial retention may be realized by the screw thread of the internal skirt.

Advantageously, the cap according to the invention may be used for a container for storing a cosmetic, or dermatological, product, notably in the form of a cream, foam, gel, milk or paste. It may, notably, be a body hygiene product, a hair styling product, a skincare or haircare product, a makeup product, or a sun protection product.

The cap may also be used in other applications, for example for sealing bottles containing liquids to be drunk.

Figure 2:
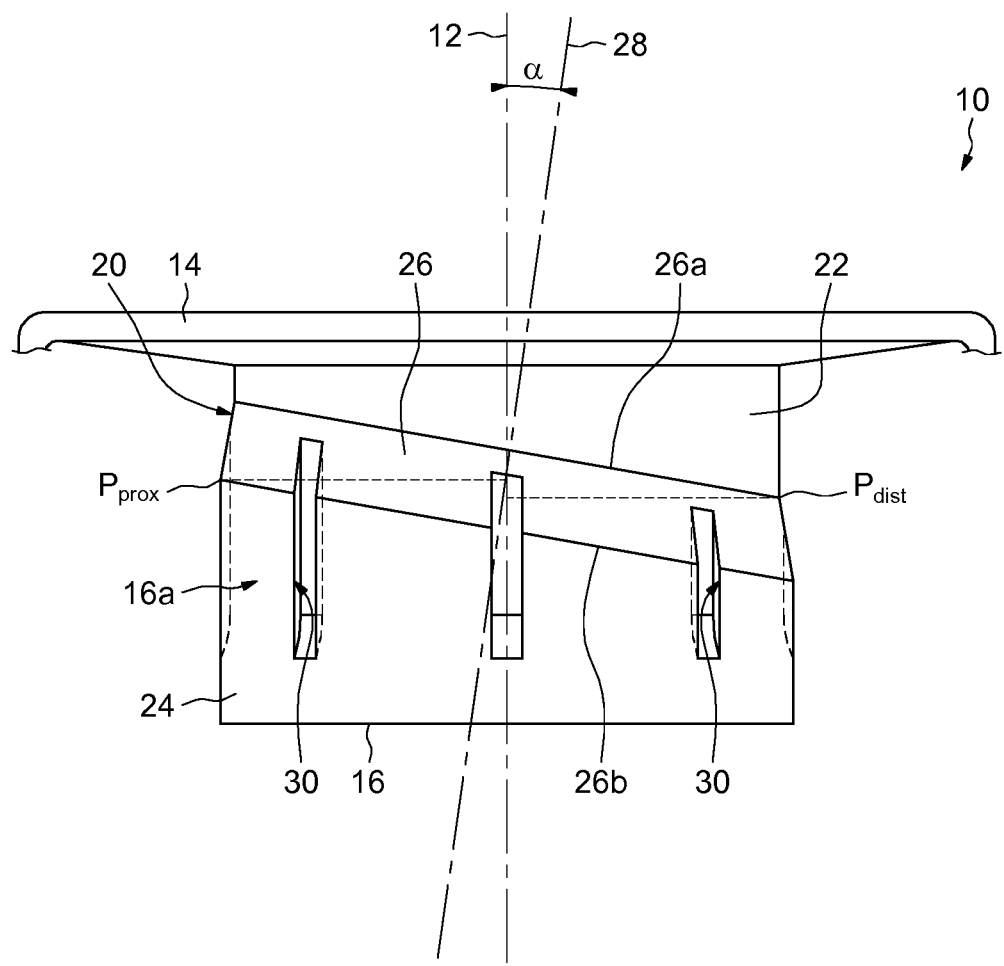
Figure 3:
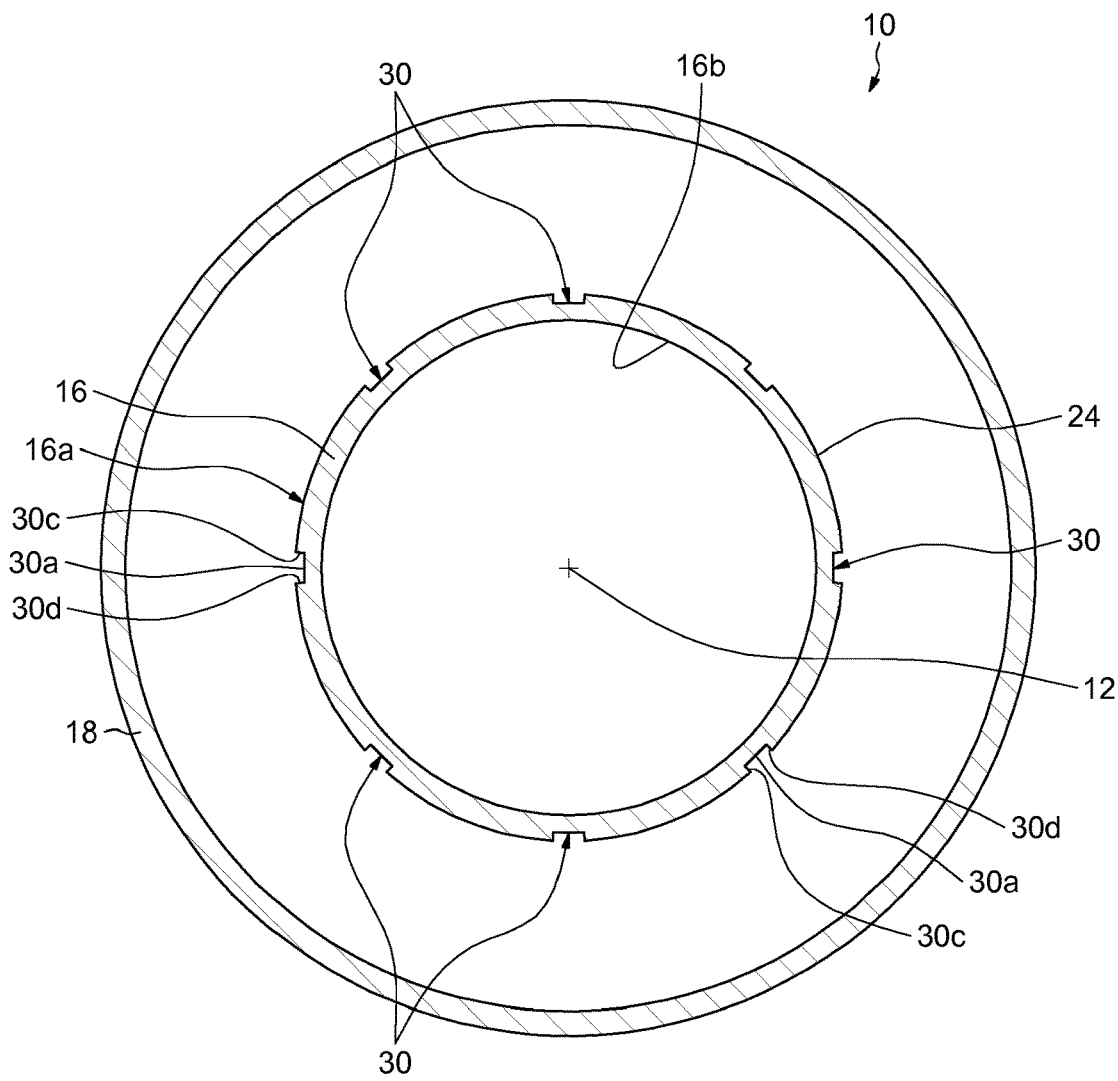
Figure 4:
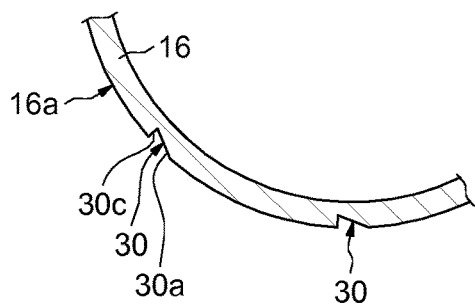
Figure 5:
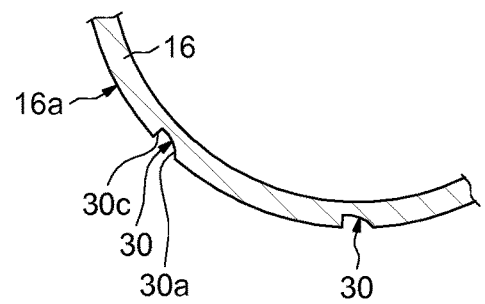
Figure 6:
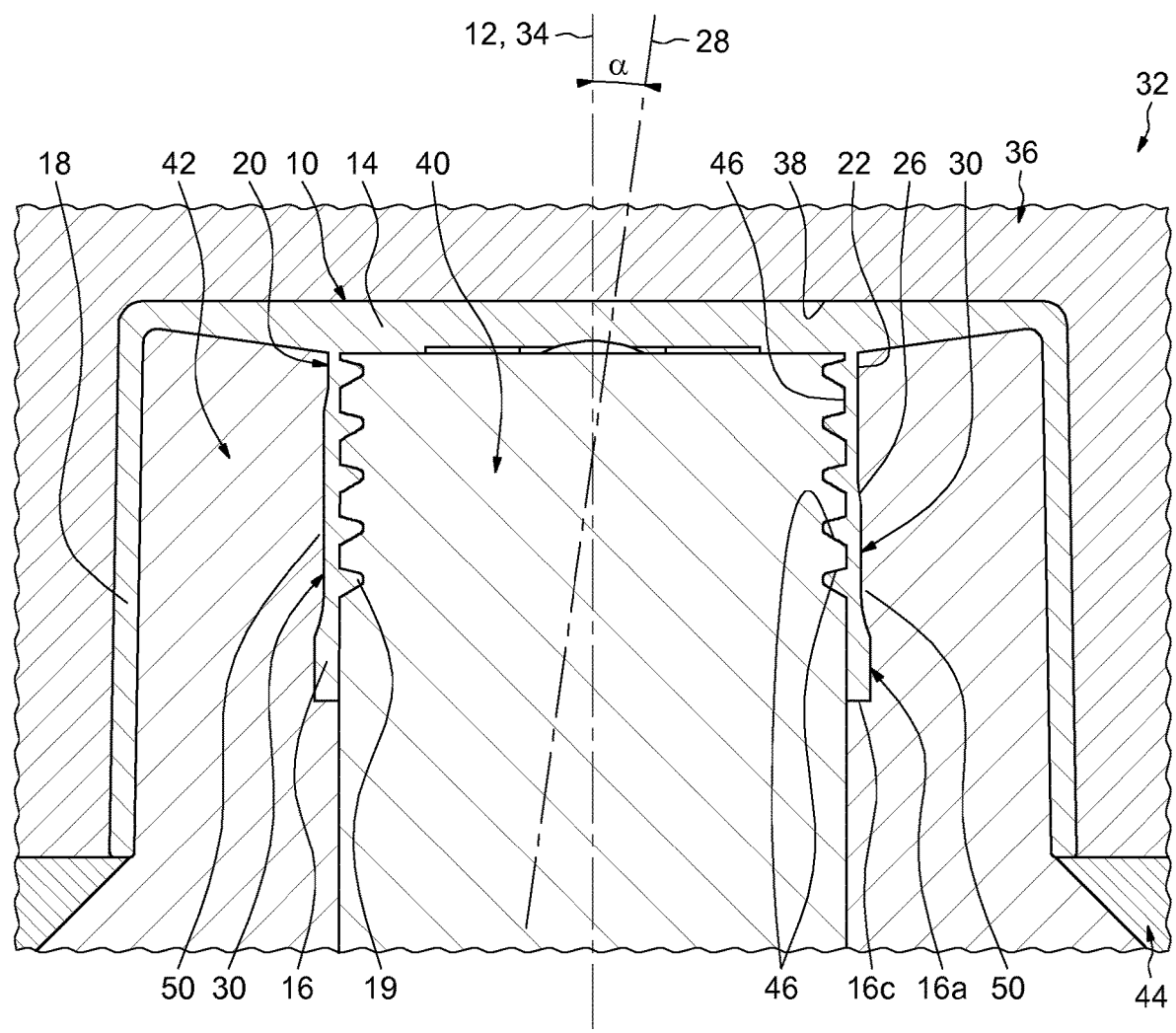
Figure 7:
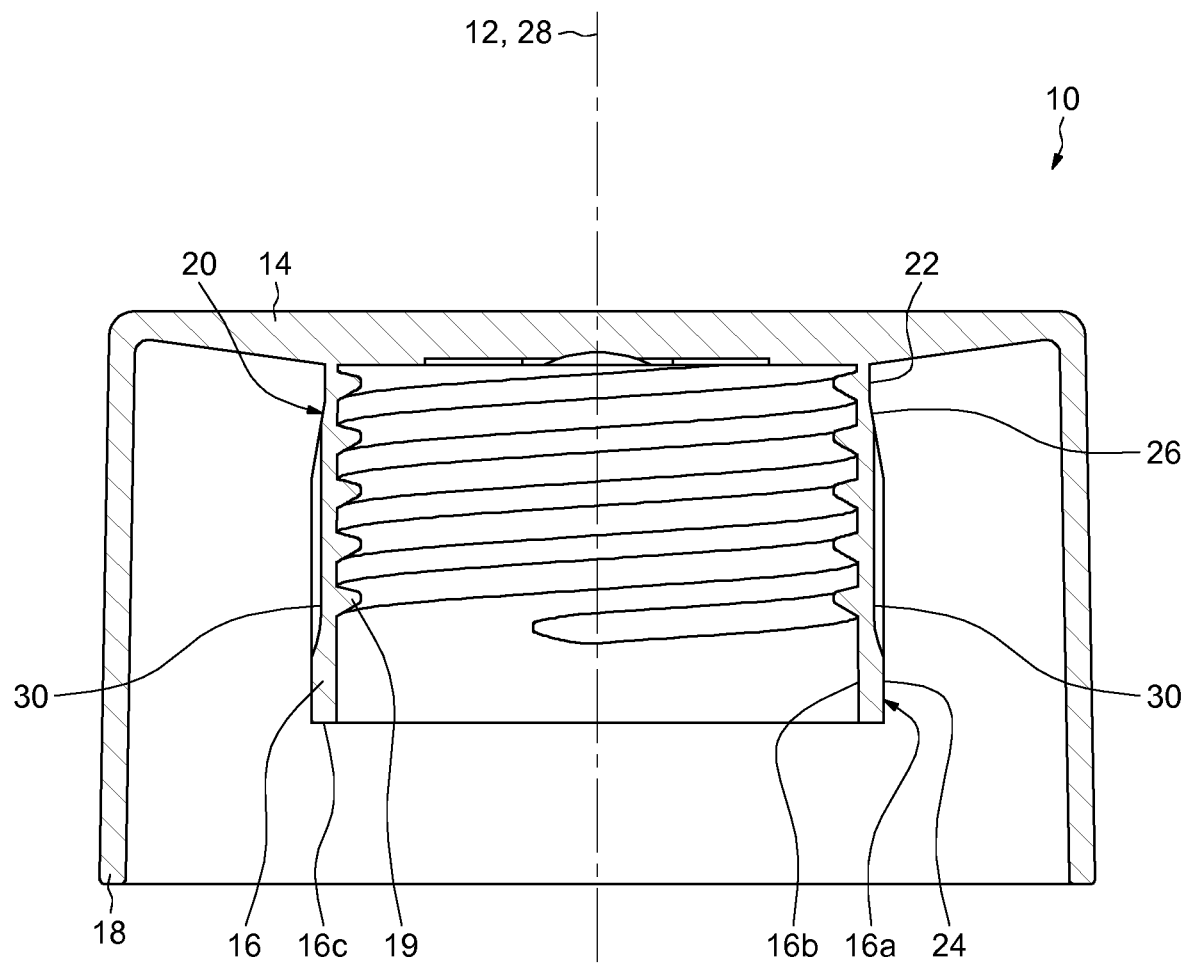
Figure 8:
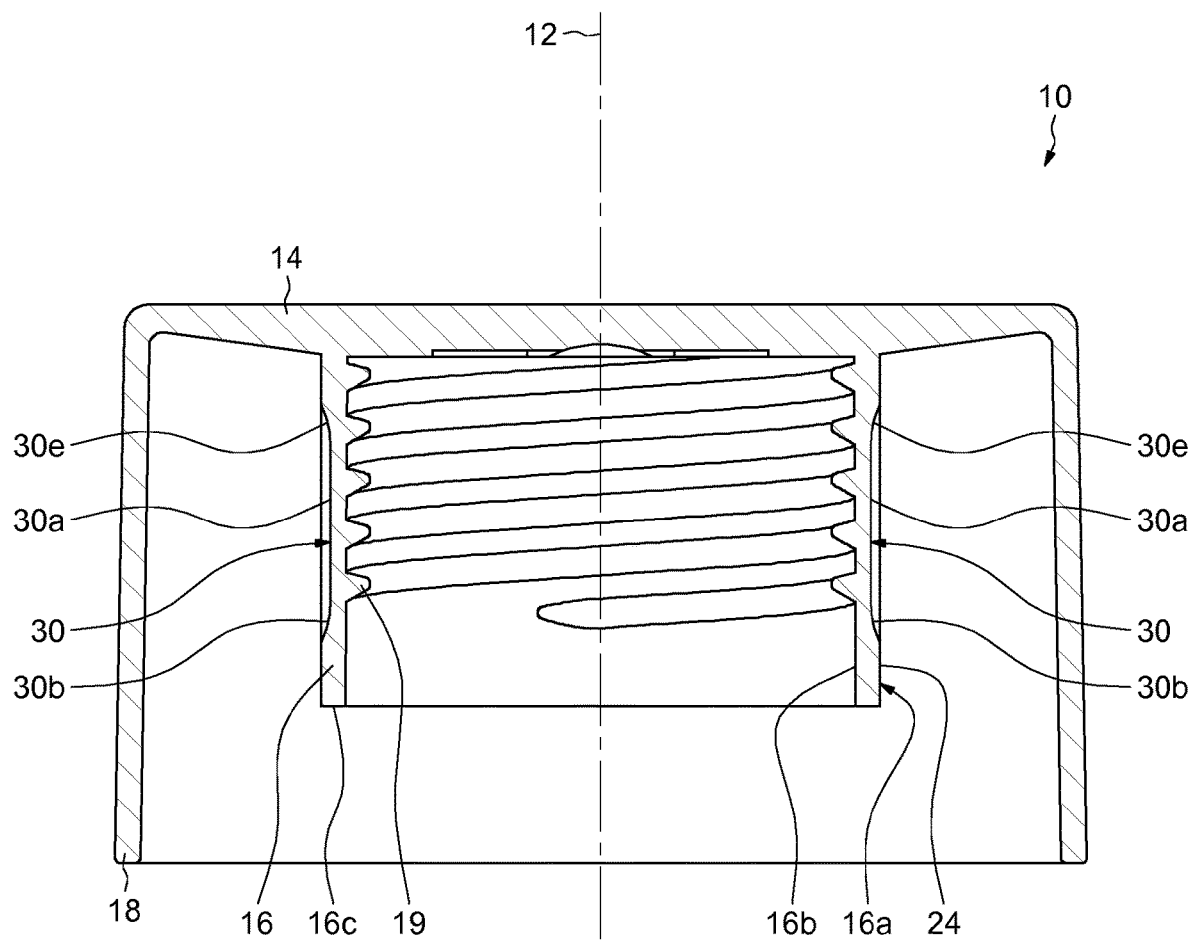

The present invention will be understood better from studying the detailed description of embodiments that are given by way of entirely non-limiting example and are illustrated by the appended drawings, in which:

FIG. 1 is a cross-sectional view of a closure cap according to a first exemplary embodiment of the invention, FIG. 2 is a front view of the cap from FIG. 1, in which an external enclosing skirt has not been depicted, FIG. 3 is a cross section of the cap along the axis III-III in FIG. 1, FIGS. 4 and 5 are partial views in cross section of the cap according to second and third exemplary embodiments of the invention, FIG. 6 is a schematic cross-sectional view showing the cap from FIG. 1 in a moulding position inside a mould, FIG. 7 is a cross-sectional view of a closure cap according to a fourth exemplary embodiment of the invention, and FIG. 8 is a cross-sectional view of a closure cap according to a fifth exemplary embodiment of the invention.

FIG. 1 shows a lid or cap, denoted by the overall reference numeral 10, which is provided to be screwed onto a container for storing a product (not shown).

The cap 10 is shown in a position presumed to be vertical and extends along a central median axis 12. The cap 10 is produced in one piece by moulding a synthetic material, for example polypropylene (PP), polyethylene (PE), acrylonitrile butadiene styrene (ABS), polyethylene terephthalate (PET), etc.

As will be described in more detail below, the cap 10 is designed to limit the visible nature of anti-rotation means provided thereon for the demoulding thereof.

The cap 10 comprises an upper front end wall 14, an internal skirt 16 and a peripheral external skirt 18 surrounding the internal skirt. The skirts 16, 18 are centred on the axis 12. The skirts 16, 18 extend axially from the lower face of the front wall 14. The front wall 14 extends radially.

The external skirt 18, which is coaxial with the axis 12, axially continues a large-diameter edge of the front wall 14. The external skirt 18 radially surrounds the internal skirt 16, remaining radially away from the latter. The skirt 18 in this case extends axially beyond the internal skirt 16. The external skirt 18 forms an enclosing skirt of the cap 10. In the exemplary embodiment illustrated, the external skirt 18 has a circular cross section. Alternatively, it may be possible to provide a polygonal, notably square, cross section or an oval cross section, etc.

The internal skirt 16 of the cap is delimited in the radial direction by an outer surface 16a and by an opposite inner surface forming a bore 16b. The bore 16b is coaxial with the axis 12 and has a cylindrical shape. The internal skirt 16 also comprises a front face 16c forming the free end of said skirt. The front face 16c is in this case set back axially from the external skirt 18.

On the inside, the internal skirt 16 comprises a helical screw thread 19 for screwing the cap 10 onto the associated container. The screw thread 19 extends radially inwards from the bore 16b. The screw thread 19 is in this case continuous in the circumferential direction. In a variant, it is possible to provide a segmented screw thread, i.e. one that is discontinuous in the circumferential direction. The internal skirt 16 allows the cap to be screwed onto the associated storage container. In the exemplary embodiment illustrated, the screw thread 19 comprises two threads. In a variant, the screw thread 19 may comprise a single thread or a greater number of threads than two.

In the exemplary embodiment illustrated, in order to limit the appearance of material shrinkage marks on the upper face of the front wall 14 of the cap after moulding, an undercut part 20 is formed on the outer surface 16a of the internal skirt. To this end, the undercut part 20 is formed such that, in the junction zone of the internal skirt 16 with the lower face of the front wall 14, the thickness of the internal skirt 16 is reduced compared with the thickness of the rest of the skirt. In other words, the internal skirt 16 has a variable thickness in the direction of its axial length, this thickness being at a minimum in the junction zone with the front wall 14.

The internal skirt 16 comprises a proximal portion 22 with a thickness $E_1$ that is substantially constant, said proximal portion 22 extending from the lower face of the front wall 14, a distal portion 24 with a thickness $E_2$ that is substantially constant and greater than the thickness $E_1$, and a connecting portion 26 connecting said portions together. The connecting portion 26 has a thickness $E_3$ that varies along its length. The thickness of the connecting portion 26 increases gradually from the proximal portion 22 to the distal portion 24. The connecting portion 26 has a frustoconical shape. In the exemplary embodiment illustrated, the thickness $E_1$ of the proximal portion 22 is the minimum thickness of the internal skirt 16, while the thickness $E_2$ of the distal portion 24 is the maximum thickness of said skirt. By way of indication, for a maximum diameter of the internal skirt 16 equal to 26 mm, the thickness $E_1$ of the proximal portion 22 may be equal to 0.6 mm at the junction with the front wall 14, and the thickness $E_2$ of the distal portion 24 may be equal to 1.3 mm.

In the exemplary embodiment illustrated, the connecting portion 26 is inclined with respect to the axis 12 of the cap. The longitudinal axis 28 of the connecting portion 26 forms, with the central axis 12 of the cap, a non-zero inclination angle α. By way of indication, the value of the angle α may be, for example, between 8° and 15°, and preferably equal to 10°.

Referring now to FIG. 2, the connecting portion 26 is delimited in the axial direction by a circular upper edge 26a and a circular lower edge 26b. Preferably, the inclination of the connecting portion 26 is chosen such that the orthogonal projection onto the axis 12 of the cap of the proximal point, referenced $P_{prox}$, of the lower edge 26b is offset axially towards the front wall with respect to the orthogonal projection onto the axis of the distal point, referenced $P_{dist}$, of the upper edge 26a.

The proximal portion 22 of the internal skirt extends axially between the upper edge 26a of the connecting portion and the lower face of the front wall 14. In the exemplary embodiment illustrated, the proximal portion 22 is in the form of a frustoconical portion that is centred on the axis 12 of the cap and flares radially outwards towards the front face 16c of the internal skirt. The gradient of the proximal portion 22 is low, for example around 2° to 3°. Thus, in this exemplary embodiment, the undercut part 20 of the internal skirt is formed by the proximal portion 22 and the connecting portion 26. Alternatively, the proximal portion 22 may be in the form of an axial cylindrical portion. In this case, the undercut part 20 of the internal skirt is formed only by the connecting portion 26.

The distal portion 24 of the internal skirt extends axially from the lower edge 26b. The distal portion 24 delimits the front face 16c of the internal skirt. The distal portion 24 has a cylindrical shape in this case.

The cap 10 also comprises a plurality of grooves 30 formed on the outer surface 16a of the internal skirt. The grooves 30 are parallel to one another. The grooves 30 are disposed axially between the front face 16c of the skirt and the upper edge 26a of the connecting portion. Each groove 30 extends radially into the thickness of the internal skirt 16 without emerging into the bore 16b of said internal skirt. The grooves 30 do not emerge onto the front face 16c. The grooves 30 extend in this case axially along the outer surface 16a.

As is visible in FIGS. 2 and 3, the grooves 30 are spaced apart from one another in the circumferential direction, in this case regularly. The grooves 30 in this case have an axial dimension which varies gradually in the circumferential direction around the outer surface 16a. As will be described in more detail below, the grooves 30 form anti-rotation means during the demoulding of the cap 10.

Referring now to FIGS. 1 and 3, each groove 30 comprises a bottom wall 30a that is offset radially inwards with respect to the outer surface 16a of the internal skirt, and a lower end edge 30b delimiting said groove in the axial direction towards the front face 16c of the internal skirt. The end edge 30b is situated axially away from this front face 16c. Each groove 30 also comprises two opposite lateral edges 30c, 30d which delimit said groove in the circumferential direction. The edges 30b to 30d are joined to the bottom wall 30a. The lateral edges 30c, 30d extend axially. The end edge 30b extends obliquely between the bottom wall 30a and the outer surface 16a of the internal skirt. The value of the angle formed between the direction of extension of the end edge 30b and the axis 12 is preferably between 10° and 85°, better still between 20° and 30°. In a variant, provision may also be made for the end edge 30b to extend between the bottom wall 30a and the outer surface 16a of the internal skirt, following a curved profile.

By way of indication, for an outside diameter of the internal skirt 16 of between 10 mm and 60 mm, the depth of the grooves 30 in the radial direction may be between 0.2 mm and 0.7 mm, and the dimension of these grooves in the circumferential direction may be between 0.6 mm and 5 mm. In the exemplary embodiment illustrated, the grooves 30 have a rectangular profile in cross section. In a variant, it is possible to provide a triangular cross section, as is illustrated in FIG. 4. In this case, the bottom wall 30a of each groove is inclined and is joined directly to the outer surface 16a. Each groove 30 comprises a single lateral edge 30c. In another variant that is illustrated in FIG. 5, the bottom wall 30a of each groove, which is joined directly to the outer surface 16a, may have a concave shape. Alternatively, it could be possible to provide other cross sections, for example square, in the form of a circular arc, etc.

FIG. 6 schematically shows, in cross section, the cap 10 in a moulding position inside a manufacturing mould 32. The mould 32, of axis 34 coaxial with the axis 12 of the cap, mainly comprises a matrix 36 provided with a cavity 38 with a shape corresponding to the outer shape of the cap, and an inner core 40 and an outer core 42 for moulding the inner shapes thereof. The mould 32 also comprises an ejection support 44 interposed axially between the matrix 36 and the outer core 42.

The inner core 40, of axis 34, comprises, on its outer surface, helical grooves 46 for moulding the threads of the screw thread 19 of the internal skirt of the cap. The outer core 42 has an annular shape. The outer core 42 radially surrounds the inner core 40 and has a shape complementary to that of the bore of the external skirt 18 of the cap and of the outer surface of the internal skirt 16.

The cap 10 is demoulded from the mould 32 as follows. In a first step, the cores 40, 42 and the cap 10 are withdrawn jointly from the matrix 36 of the mould.

In a second step, the inner core 40 is unscrewed from the bore of the internal skirt 16 of the cap. The grooves 30 made in the outer surface of the internal skirt 16 prevent the cap from rotating during this step of unscrewing the inner core 40. The grooves 30 cooperate with complementary protuberances 50 of the bore of the outer core 42. The angular retention of the cap 10 with respect to the outer core 42 is obtained by the circumferential contact between one of the lateral edges of each groove and the protuberances 50 of the core. This lateral edge of each groove 30 forms a blocking or anti-rotation edge of the cap.

Next, during a third step, the cap 10 is demoulded from the outer core 42 by way of the ejection support 44. During this step, the undercut part 20 of the outer surface of the internal skirt 16 and the grooves 30 are demoulded by force. The outer core 42 exerts a demoulding force which tends to deform the internal skirt 16 of the cap radially inwards and to axially stretch said skirt towards the front face 16c.

Given the inclination of the connecting portion 26 of the undercut part 20 of the internal skirt with respect to the axis 12, contact between this connecting portion and the outer core 42 is not continuous in a plane perpendicular to said axis 12. This contact is continuous in a plane which is inclined with respect to the axis 12 and the normal of which corresponds to the axis 28.

Thus, during the demoulding of the undercut part 20 by force, the force exerted by the outer core 42 on the outer surface 16a of the internal skirt in the vicinity of the front wall 14 is limited. Specifically, considering a radial plane perpendicular to the axis 12, the demoulding force is exerted by the core 42 over a limited angular sector. In this radial plane, the internal skirt 16 of the cap is deformed radially inwards and stretched axially only in this angular sector. Thus, the risk of marks being formed on the upper face of the front wall 14 of the cap, it being possible for these marks to be formed during the demoulding of the cap, is limited.

In one variant embodiment, it remains possible, however, to provide a different design of the internal skirt with a proximal portion 22 having a constant axial length around the circumference of the internal skirt and a connecting portion 26 centred on the axis 12 of the cap. Such a variant is illustrated in FIG. 7, in which identical elements bear the same references.

In another variant embodiment, illustrated in FIG. 8, in which identical elements bear the same references, it is possible for the cap 10 not to have an undercut part formed on the outer surface 16a of the internal skirt. In this example, the internal skirt 16 of the cap has a substantially constant thickness. Each groove 30 in this case comprises an upper end edge 30e delimiting said groove in the axial direction towards the front wall 14 of the cap.

In the exemplary embodiments illustrated, the cap comprises grooves formed on the outer surface of the internal skirt in order to ensure the anti-rotation function during the step of unscrewing the inner core of the mould during the demoulding phase. In a variant, it is possible to provide other types of recessed recesses provided in the outer surface of the internal skirt, for example striations, notches, dishes, etc.

By virtue of the invention, a cap is provided in which the presence of these anti-rotation elements on the internal skirt are rendered less visible to the consumer when this cap is removed from the associated container.

The invention claimed is:

1. A closure cap for a container, comprising:
   an internal skirt delimited in the radial direction by an outer surface and by an opposite bore and comprising at least one helical screw thread for screwing said cap onto the container, said helical screw extending radially inwards from the bore,
   an external skirt radially surrounding said internal skirt at least partially, and
   a front wall from which said internal and external skirts extend, the cap being produced by moulding at least one synthetic material, wherein at least one recess is formed on the outer surface of the internal skirt, remaining axially away from a front end face of said skirt.

2. Cap according to claim 1, wherein said recess extends into the thickness of the internal skirt without emerging inside the bore of said skirt.

3. Cap according to claim 1, wherein said recess comprises a bottom wall that is offset radially inwards with respect to the outer surface of the internal skirt, at least one lateral edge being joined to the bottom wall and delimiting said recess in the circumferential direction, and at least one end edge being joined to the bottom wall, being situated axially towards the front end face and delimiting said recess in the axial direction.

4. Cap according to claim 3, wherein said lateral edge extends axially with respect to a central axis of said cap.

5. Cap according to claim 3, wherein said end edge extends obliquely between the bottom wall and the outer surface of the internal skirt.

6. Cap according to claim 5, wherein the value of the angle formed between the direction of extension of said end edge and a central axis of said cap is between 10° and 85°, preferably between 20° and 30°.

7. Cap according to claim 1, wherein said recess is a groove or a striation.

8. Cap according to claim 1, comprising a plurality of recesses formed on the outer surface of the internal skirt.

9. Cap according to claim 8, wherein the recesses are spaced apart from one another regularly in the circumferential direction.

10. Device for packaging a product comprising a container for storing said product, which is provided with a neck, and a closure cap according to claim 1, which is screwed onto said neck.

11. A closure cap for a container comprising:
    an internal skirt provided with a bore and with at least one helical screw thread for screwing said cap onto the container, said helical screw extending radially inwards from the bore,
    an external skirt radially surrounding said internal skirt at least partially, and
    a front wall from which said internal and external skirts extend, the cap being produced by at least one synthetic material, wherein at least one recess is formed on an outer surface of the internal skirt which is radially opposite to the bore of said internal skirt, remaining axially away from a front end face of said skirt, said recess comprising at least one lateral edge which delimits said recess in the circumferential direction.

12. A closure cap for a container comprising:
    an internal skirt provided with a bore and with at least one helical screw thread for screwing said cap onto the container, said helical screw extending radially inwards from the bore,
    an external skirt radially surrounding said internal skirt at least partially, and
    a front wall from which said internal and external skirts extend, the cap being produced by at least one synthetic material, wherein a plurality of recesses is formed on an outer surface of the internal skirt, remaining axially away from a front end face of said skirt, said recesses being spaced apart from one another in the circumferential direction.

* * * * *